(No Model.)
H. T. BUCKLEY & W. H. WINELAND.
BOLT.
No. 310,787. Patented Jan. 13, 1885.
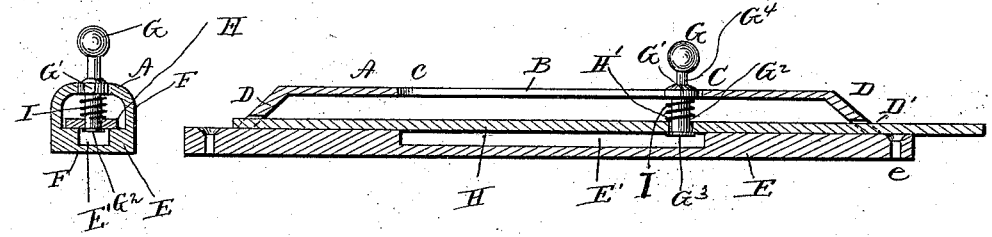
WITNESSES
Franck L. Ourand
John T. Suter Jr
INVENTORS
Herbert T. Buckley
William H. Wineland
Frank H. Fouts
Attorney

UNITED STATES PATENT OFFICE.

HERBERT T. BUCKLEY AND WILLIAM H. WINELAND, OF EASTON, PA.

BOLT.

SPECIFICATION forming part of Letters Patent No. 310,787, dated January 13, 1885.

Application filed July 1, 1884. (No model.)

*To all whom it may concern:*

Be it known that we, HERBERT T. BUCKLEY and WILLIAM H. WINELAND, both citizens of the United States, residing at Easton, in the county of Northampton and State of Pennsylvania, have invented certain new and useful Improvements in Bolts, of which the following is a specification, reference being had therein to the accompanying drawings.

Our invention relates to bolts; and it consists in the parts which will be hereinafter described, and pointed out in the claim.

In the accompanying drawings, Figure 1 is a central longitudinal section. The bolt in this view is flat. Fig. 2 is a transverse section of the construction shown in Fig. 1. Fig. 3 is a central longitudinal section showing a round bolt and form of spring preferably used in connection therewith. Fig. 4 is a plan view of the cap-plate.

Like letters indicate like parts throughout the several views.

A represents the cap-plate, provided with central longitudinal opening, B, the walls whereof are parallel.

C C are circular openings at each end of the opening B.

D are the beveled surfaces near the ends of the cap-plate, provided with the openings D'.

$e$ $e$ are countersunk bolt-openings through the ends of the base-plate E.

G represents a ball thumb-piece, provided with shoulder G', shank $G^2$, and bottom collar, $G^3$.

H represents the flat bolt, provided with an opening, H', in which the shank $G^2$ is fitted.

I is a spiral spring encircling the shank $G^2$. One end of said spring rests against the under side of the shoulder G', and the other end rests against the upper side of the bolt H.

The operation of the device thus far described is as follows: When the bolt is in the position shown in Fig. 1, it is locked by reason of the fact that the shoulder G' is in one of the openings C. In order to disengage and slide the bolt, the knob G should be pressed inward, which will force the shoulder G' out of engagement with the opening C. This depresses the spring I and forces the collar $G^3$ and a part of the shank $G^2$ into the base-plate opening E'. This action places the neck $G^4$ in line with the longitudinal slot B. Then by moving the ball G over the open way of the slot the bolt is moved. When the collar G' arrives under the opening C at the opposite end of the slot, the spring I will force said collar out through said opening, and thereby lock the bolt. It will thus be observed that the bolt may be moved within its casing and automatically locked at each end of its limited line of travel. The collar $G^3$ on the under side of the shank $G^2$ prevents the displacement of the bolt G, shoulder G', and shank $G^2$—that is to say, prevents them from being withdrawn.

The construction shown in Fig. 3 is a slight modification. It is, however, within the spirit and scope of the invention illustrated in the other figures.

J represents the round bolt, provided with a depression, J'.

K represents a flat spring having one end secured to the bolt J. The body of said spring is suspended within the bolt-opening J'. The movable end of the spring is secured to the under side of the shoulder G'.

L is a flat base-plate, as shown in Fig. 3. It will be observed that the inner side of the base-plate in Fig. 1 is recessed, while the bolt is smooth. In Fig. 3 the recess is shown in the bolt, while the plate is smooth. In both cases the depressions are adapted to receive the parts attached to the knob and admit the longitudinal movement thereof when said knob is moved. The cap-plate A and its specified openings are used in the construction shown in Figs. 1 and 3, excepting that the rectangular openings D' are made circular when used in connection with the round bolt J in Fig. 3.

A flat spring can be used with a flat bolt or a spiral spring with a round bolt. For this reason we hold that the devices shown are substantially mechanical equivalents.

Having thus described our invention we claim as new and desire to secure by Letters Patent—

A bolt provided with an opening having a catch therein, said catch consisting of a neck, shoulder, shank, and collar, said shank being provided with an encircling spiral spring interposed between the under side of said collar and the face of the bolt, a face-incasing plate provided with a central longitudinal slot with enlarged terminal openings, and one or more end openings to admit the passage of the end of the bolt, in combination with a base-plate having a recess therein, substantially as described, and for the purposes set forth.

In testimony whereof we affix our signatures in presence of two witnesses.

HERBERT T. BUCKLEY.
WM. H. WINELAND.

Witnesses:
JOHN EVANS,
JNO. L. WILSON.